July 21, 1942.   G. D. SHANAHAN ET AL   2,290,715
PORTABLE CONTAINER
Original Filed Jan. 30, 1939   2 Sheets-Sheet 1

INVENTORS
GEORGE D. SHANAHAN
CLYDE C. HUFFMAN
ELVERT R. WARNKE
BY
ATTORNEYS

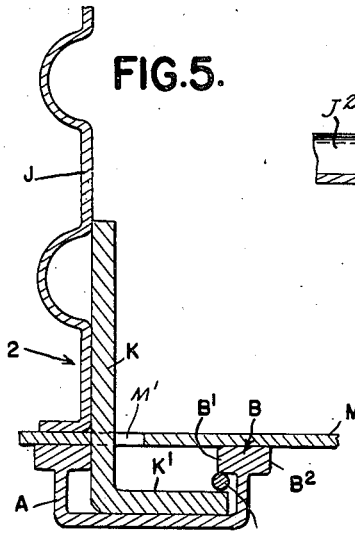
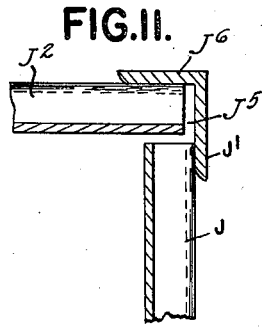
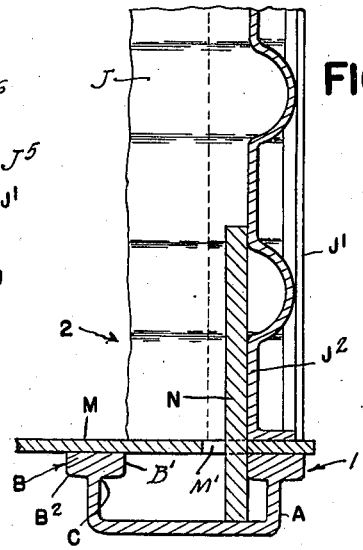
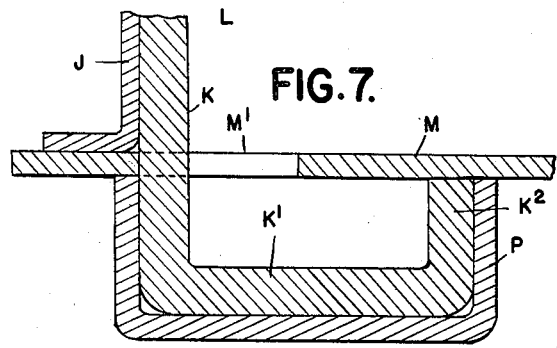
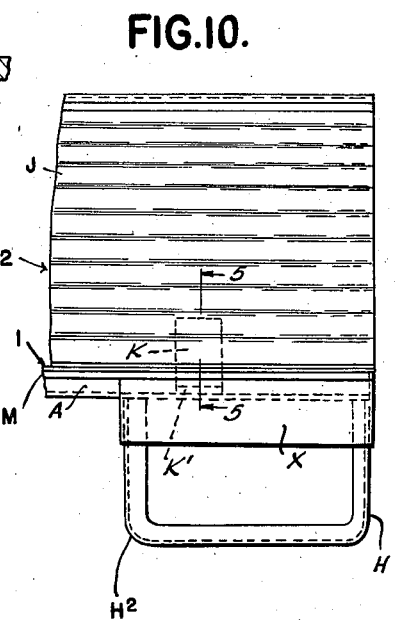
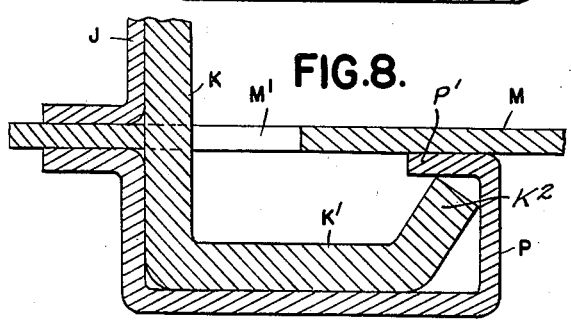
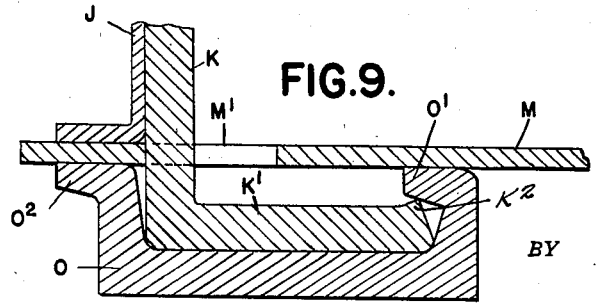

Patented July 21, 1942

2,290,715

UNITED STATES PATENT OFFICE 2,290,715

PORTABLE CONTAINER

George D. Shanahan, Clyde C. Huffman, and Elvert R. Warnke, Detroit, Mich., assignors to Steel Plate & Shape Corporation, Detroit, Mich., a corporation of Delaware Original application January 30, 1939, Serial No. 253,652. Divided and this application May 1, 1939, Serial No. 271,128

6 Claims. (Cl. 220—1.5)

This invention relates generally to portable containers, such as those used by manufacturers for handling in their shops and buildings raw material and manufactured articles, and constitutes a division of our application filed January 30, 1939, Serial No. 253,652.

One of the essential objects of the invention is to provide a container of this type capable of being readily used with electric or mechanical lifts or elevating trucks and on rollers in the floors of loading and receiving docks, or in railway or highway vehicles to facilitate transportation in loaded condition from one point, via railway or highway vehicles, to a distant point. For example, after being loaded, such containers may be lifted by an elevating truck and carried from one point to another in the same plant, or they may be transferred in loaded condition to a loading dock or to a railway car or highway vehicle. When such vehicle reaches its destination, the containers in unloaded condition may be transferred to a receiving dock or to other lift trucks which can carry them to the particular point or place where it is desired to effect the unloading. Thus, there is only one loading and one unloading of the goods carried by the containers. As a result, less labor and time are required and damage to the goods due to handling has been reduced to a minimum.

Another object is to provide a container having legs designed so the containers may be stacked or nested, one on top of the other, for shipment or storage, and that may ride easily on rollers or other suitable runways in or on the floors of loading and receiving docks and of railway or highway vehicles.

Another object is to provide an efficient construction that may, as desired, be used either as a platform or a knock-down box container or receptacle, and that can be readily returned unloaded or with a new load to its shipping point.

Another object is to provide a container which permits either the goods to be carried, or a box or other suitable receptacle for the goods to be easily and quickly attached to or detached from the container platform.

Another object is to provide a container that is constructed in such a way that articles or receptacles for articles of various sizes and shapes may be carried and readily secured or anchored to the container platform.

Another object is to provide a container that may be handled, lifted or moved about easily in either loaded or unloaded condition.

Other objects, advantages and novel details of construction of this invention will be made more apparent as this description proceeds, especially when considered in connection with the accompanying drawings, wherein:

Figure 5 is an enlarged vertical sectional view taken on the line 5—5 of Figure 10;

Figure 6 is an enlarged vertical sectional view taken on the line 6—6 of Figure 4;

Figures 7, 8 and 9 are vertical sections showing different modifications;

Figure 10 is a side elevation of a portion of the platform with the container mounted thereon;

Figure 11 is a horizontal sectional view through a corner of the container.

Figure 1:
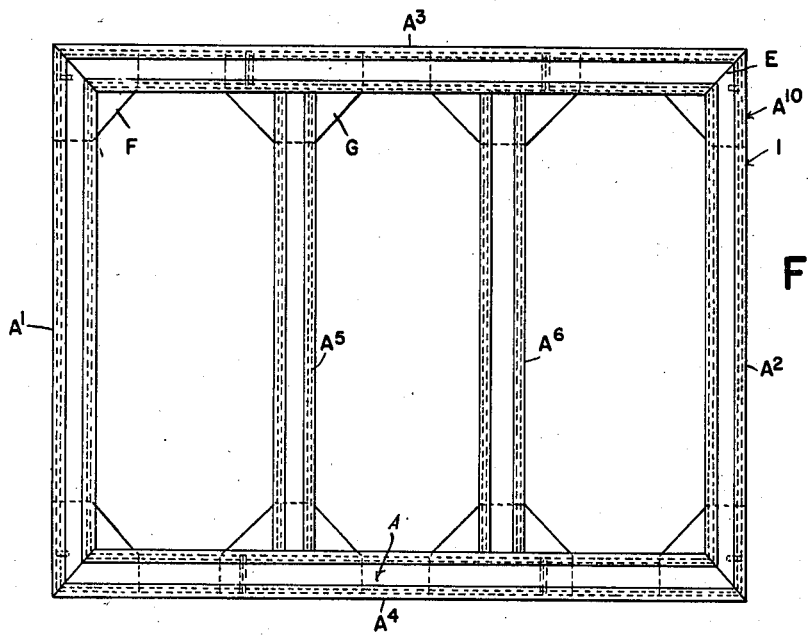
Figure 1 is a top plan view of our improved portable platform with the bottom plate removed.
Figure 2:
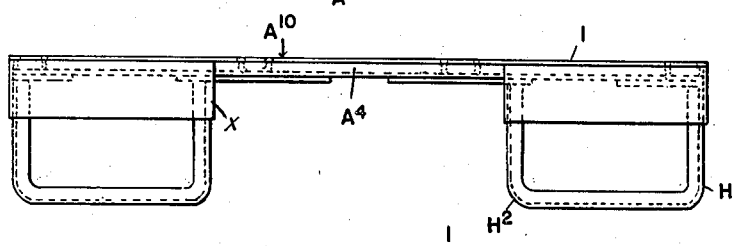
Figure 2 is a side elevation of our portable platform.
Figure 3:
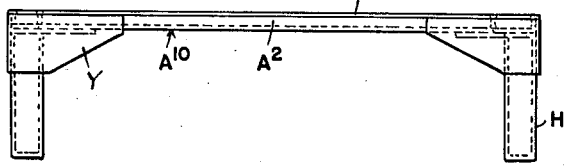
Figure 3 is an end elevation of our portable platform.
Figure 4:
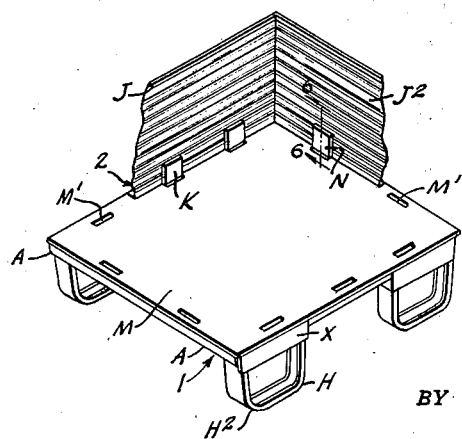
Figure 4 is a perspective view of the platform and bottom plate thereon and showing portions of adjacent upright end and side walls on said bottom plate.

Referring now to the drawings, 1 is the platform and 2 is the receptacle of a portable container embodying our invention.

As shown, the platform 1 is formed of channel members A having T-shaped heads B forming inwardly and outwardly extending flanges $B'$, $B^2$ and providing undercut channels C. These bars are cut to lengths for forming the ends $A'$, $A^2$ and the sides $A^3$, $A^4$ of a rectangular frame $A^{10}$ with mitered corners E. There are also a plurality of parallel cross bars $A^5$, $A^6$ which extend across between the bars $A^3$ and $A^4$. Such bars may be secured to each other by welding or by the use of gusset plates F at the four corners and double gusset plates G between the cross members $A^5$ and $A^6$ and the side bars $A^3$ and $A^4$. The platform is further provided with suitable supporting legs which, as shown at H, are U-shaped and formed of bent channel bars. Their upper ends are secured to the bottoms of the frame members or to the gusset plates F and G and they are further reinforced by gusset members X and angle extensions Y thereof. Thus, the completed platform will be strong and light and is provided with the upwardly opening undercut channels extending completely around the margins of the frame, as well as along each of the transverse bars. This facilitates the attachment of the article or articles to be transported through the use of fastener devices (not shown)

which are engageable with the undercut channels. Furthermore, as all of the marginal members of the frame are channeled, this facilitates the engagement therewith of lifting means.

It will also be noted that the legs H have rounded corners $H^2$ and are, in effect, runways capable of riding easily on rollers or other suitable runways in or on the floors of loading or receiving docks and of railway or highway vehicles. Moreover, the leg construction H is such that the elevator of a lift truck may be easily engaged with or disengaged from the platform when it is desired to move the platform about in either loaded or unloaded condition.

The receptacle 2 may be formed of either flat or corrugated sheet metal which may be either perforated or imperforated, as desired. Preferably, the receptacle 2 has separate side plates J and end plates $J^2$ held together at their corners by vertically extending angle bars J'. As shown in Figure 11, the bars J' are welded to the side plates J and overlap the end plates $J^2$. A bottom closure M is provided for the receptacle and this may be either separate from or rigid with the side and end plates J and $J^2$ or the channels A of the platform. In either instance such closure M is provided in registration with the interior of the upwardly opening channels A with apertures M'.

Such receptacle 2 is secured in position on the platform 1 by depending bars K and N that are rigidly secured to the side and end plates J and $J^2$, respectively, and extend into the upwardly opening channels A of the frame $A^{10}$. One or more of these bars K may be provided with angle flanges K' that contact with the bottom of the channel and are adapted to extend underneath one of the inwardly extending flanges B' of the T-shaped heads B. A cylindrical key or locking member L welded or otherwise rigidly secured to the flanges K' is engageable with the underside of the flanges B' to hold the flanges K' in position.

In use, after the bottom closure M has been located upon the channels A of the platform, the side and end plates J and $J^2$ may be assembled as follows. First, the side plates J are laid one at a time flat upon the bottom closure M with the flanges K' in vertical alignment with the apertures M'. The inner edges of the side plates J are then grasped so that the said plates may be swung upon their outer edges from the horizontal position mentioned to the vertical position illustrated in Figure 5, to cause the flanges K' to enter the apertures M' and swing under the closure M until the key L engages the underside of the flange B'. Then the end plates $J^2$ are dropped vertically in the spaces $J^5$ between the flanges $J^6$ of the bars J' and the adjacent ends of the side plates J until the depending bars N enter the apertures M' as illustrated in Figure 6.

In place of the rolled channel bars, the frame members may be formed of pressed sheet metal channel members P, as shown in Figures 7 and 8. Also, in place of channel members having T heads, members O having an inwardly extending flange O' at one side and an outwardly extending flange $O^2$ at the opposite side may be used, as shown in Figure 9. In place of the locking key L, the flanges K' of the members K may be provided with upturned end portions $K^2$, as shown in Figures 7, 8 and 9. All of the various modifications have the common feature of providing upwardly opening channels in the load carrying surface of the frame, which facilitate the attachment of other members thereto or the engagement of the platform with the lifting devices. When it is desired to insert the bars K and flanges K' illustrated in Figures 7, 8 and 9 into the channels P and O, respectively, the same procedure described above in connection with the elements in Figure 5 is followed. In Figure 7, the upturned portion $K^2$ will engage the underside of or will be directly beneath the bottom closure M, while in Figures 8 and 9 the upturned portions $K^2$ will engage the underside of the inwardly extending flanges P' and O', respectively, which in turn engage the underside of the bottom closure M.

What we claim as our invention is:

1. A knockdown container of the class described comprising a substantially horizontal frame having two longitudinally and two transversely extending bars rigidly secured together in substantially a common horizontal plane and provided throughout their length with upwardly opening channels, the inner side walls of said channels having laterally projecting load carrying portions overhanging the channels throughout their length, a bottom plate covering said bars and resting on the load carrying portions thereof, said plate having spaced apertures in vertical alignment with the upwardly opening channels, and a removable enclosure on said bottom plate having separate upright side and end walls resting on said bottom plate adjacent the apertures therein, and anchorage means for said side walls including substantially L-shaped members having the upright portions thereof secured to the upright side walls and extending downwardly through the adjacent apertures in the bottom plate into the longitudinally extending channels, the horizontal portions of the L-shaped members being in said longitudinally extending channels beneath the bottom plate and having upward projections engaging the underside of the adjacent overhanging load carrying portions aforesaid, substantially straight upright members rigid with the end walls and extending downwardly through the adjacent apertures in said bottom plate into the transversely extending channels, the end walls overlapping and free of the ends of the side walls, and bars rigidly secured to the side walls at the ends thereof and having lateral flanges overlapping and free of the end walls.

2. A knockdown container of the class described comprising a substantially horizontal frame having two longitudinally and two transversely extending upwardly opening channel bars rigidly secured together in substantially a common horizontal plane, the inner side walls of said channel bars being provided over and throughout the length of the channels with substantially horizontal load carrying portions, a bottom plate covering said bars and resting on said load carrying portions, said plate having spaced apertures in vertical alignment with the upwardly opening channels, and a removable enclosure on said bottom plate having separate upright side and end walls resting on said bottom plate adjacent the apertures therein, and anchorage means for said side walls including members having portions secured to the upright side walls and extending downwardly through the adjacent apertures in the bottom plate into the longitudinally extending channels, said anchorage members also having portions in said longitudinally extending channels beneath the bottom plate, the last mentioned portions engaging the underside of the load carrying portions aforesaid, substantially straight upright members rigid with the end walls and extending downwardly through the adjacent apertures in said bottom plate into the transversely extending channels, the end walls overlapping and free of the ends of the side walls, and bars rigidly secured to the side walls at the ends thereof and having lateral flanges overlapping and free of the end walls.

3. A knockdown container of the class described comprising a substantially horizontal frame having two longitudinally and two transversely extending bars rigidly secured together in substantially a common horizontal plane and provided throughout their length with upwardly opening channels, the inner side walls of said channels having laterally projecting load carrying portions overhanging the channels throughout their length, a bottom plate covering said bars and resting on the load carrying portions thereof, said plate having spaced apertures in vertical alignment with the upwardly opening channels, and a removable enclosure on said bottom plate having separate upright side and end walls resting on said bottom plate adjacent the apertures therein, and anchorage means for said side walls including substantially L-shaped members having the upright portions thereof secured to the upright side walls and extending downwardly through the adjacent apertures in the bottom plate into the longitudinally extending channels, the horizontal portions of the L-shaped members being in said longitudinally extending channels beneath the bottom plate and having upward projections engaging the underside of the adjacent overhanging load carrying portions aforesaid, substantially straight upright members rigid with the end walls and extending downwardly through the adjacent apertures in said bottom plate into the transversely extending channels, and means carried by the side walls for detachably holding the end walls in assembled relation with respect thereto.

4. A knockdown container of the class described comprising a substantially horizontal frame having two longitudinally and two transversely extending upwardly opening channel bars rigidly secured together in substantially a common horizontal plane, the inner side walls of said channel bars being provided over and throughout the length of the channels with substantially horizontal load carrying portions, a bottom plate covering said bars and resting on said load carrying portions, said plate having spaced apertures in vertical alignment with the upwardly opening channels, and a removable enclosure on said bottom plate having separate upright side and end walls resting on said bottom plate adjacent the apertures therein, and anchorage means for said side walls including members having portions secured to the upright side walls and extending downwardly through the adjacent apertures in the bottom plate into the longitudinally extending channels, said anchorage members also having portions in said longitudinally extending channels beneath the bottom plate, the last mentioned portions engaging the under side of the load carrying portions aforesaid, substantially straight upright members rigid with the end walls and extending downwardly through the adjacent apertures in said bottom plate into the transversely extending channels, and means carried by the side walls for detachably holding the end walls in assembled relation with respect thereto.

5. A knockdown container of the class described comprising a substantially horizontal frame having two longitudinally and two transversely extending bars rigidly secured together in substantially a common horizontal plane and provided throughout their length with upwardly opening channels, the inner side walls of said channels having laterally projecting load carrying portions overhanging the channels throughout their length, a bottom plate covering said bars and resting on the load carrying portions thereof, said plate having spaced apertures in vertical alignment with the upwardly opening channels, separate upright walls resting on said bottom plate adjacent the apertures therein, and anchorage means for said walls including substantially L-shaped members having the upright portions thereof secured to the upright walls and extending downwardly through the adjacent apertures in the bottom plate, the horizontal portions of the L-shaped members being in said channels beneath the bottom plate and having upward projections engaging the underside of the overhanging load carrying portions aforesaid.

6. A knockdown container of the class described, comprising a substantially horizontal frame having two longitudinally and two transversely extending upwardly opening channel bars rigidly secured together in substantially a common horizontal plane, the inner side walls of said channel bars being provided over and throughout the length of the channels with substantially horizontal load carrying portions, a bottom plate covering said bars and resting on the load carrying portions thereof, said plate having spaced apertures in vertical alignment with the upwardly opening channels, separate upright walls resting on said bottom plate adjacent the apertures therein, and anchorage means for said walls including members having portions secured to the upright walls and extending downwardly through the adjacent apertures in the bottom plate, said anchorage members also having portions in said channels beneath the bottom plate, the last mentioned portions of said anchorage members engaging the underside of the load carrying portions aforesaid.

GEORGE D. SHANAHAN.
CLYDE C. HUFFMAN.
ELVERT R. WARNKE.